(12) United States Patent  (10) Patent No.: US 8,201,772 B2
Wendelsdorf et al.  (45) Date of Patent: Jun. 19, 2012

(54) METHOD FOR SUPPRESSING VIBRATION AND ACOUSTIC SIGNATURE IN A TILTROTOR AIRCRAFT

(75) Inventors: Joseph W. Wendelsdorf, Arlington, TX (US); Victor L. Berry, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 191 days.

(21) Appl. No.: 12/595,286

(22) PCT Filed: Apr. 11, 2008

(86) PCT No.: PCT/US2008/060056
§ 371 (c)(1),
(2), (4) Date: Oct. 9, 2009

(87) PCT Pub. No.: WO2008/128059
PCT Pub. Date: Oct. 23, 2008

(65) Prior Publication Data
US 2010/0059632 A1  Mar. 11, 2010

(51) Int. Cl.
*B64C 27/52* (2006.01)
(52) U.S. Cl. .................. 244/17.25; 244/56
(58) Field of Classification Search ............ 244/7 R, 244/174, 175
See application file for complete search history.

(56) References Cited

U.S. PATENT DOCUMENTS

| | | | | |
|---|---|---|---|---|
| 2,344,967 A | * | 3/1944 | Bennett | 244/17.23 |
| 3,368,778 A | | 2/1968 | Wilde | |
| 4,236,607 A | * | 12/1980 | Halwes et al. | 188/379 |
| 4,947,356 A | * | 8/1990 | Elliott et al. | 700/280 |
| 5,148,402 A | * | 9/1992 | Magliozzi et al. | 700/280 |
| 5,150,855 A | * | 9/1992 | Kaptein | 244/1 N |
| 5,305,981 A | | 4/1994 | Cunningham et al. | |
| 5,352,090 A | | 10/1994 | Churchill et al. | |
| 5,453,943 A | * | 9/1995 | Magliozzi | 700/280 |
| 5,551,649 A | * | 9/1996 | Kaptein | 244/1 N |
| 6,227,481 B1 | | 5/2001 | Fenny et al. | |
| 6,695,106 B2 | | 2/2004 | Smith et al. | |

(Continued)

FOREIGN PATENT DOCUMENTS

GB  506404  5/1939

OTHER PUBLICATIONS

Office Action from Chinese counterpart Application No. 200880011726.8, issued by the Patent Office of China on Jul. 28, 2011.

(Continued)

*Primary Examiner* — Timothy D Collins
*Assistant Examiner* — Michael A Fabula
(74) *Attorney, Agent, or Firm* — James E. Walton; Richard G. Eldredge

(57) ABSTRACT

A method is disclosed for suppressing an external acoustic signature of an aircraft having at least one pair of non-intermeshing multiple-blade rotors. During operation of the aircraft, the at least one pair of rotors are rotated in an asymmetrically indexed manner that causes the blades of one of each pair of rotors to be consistently out of phase from the blades of the other of each pair of rotors. The selected amount in degrees of asymmetrical indexing is equal to the desired phasing in degrees divided by a number of blades of one of the rotors.

4 Claims, 4 Drawing Sheets

U.S. PATENT DOCUMENTS 6,896,219 B2 * 5/2005 Borchers et al. .............. 244/1 N
2007/0084963 A1 * 4/2007 Nouhaud ................... 244/17.23

OTHER PUBLICATIONS

J.M. Bilger, R.L. Marr, and Ahmad Zahedi; Results of Structural Dynamic Testing of the XV-15 Tilt Rotor Research Aircraft; Presented at the 37th Annual Forum of the American Helicopter Society, New Orleans, LA, May 1981.

Office Action from Canadian counterpart Application No. 2,683,261, issued by the Canadian Intellectual Property Office on Oct. 3, 2011.

Office Action from U.S. counterpart Application No. 12/595,295, issued by the USPTO on Nov. 1, 2011.

* cited by examiner

- NORMAL SHEAR
- VIBRATION MAGNITUDE
- RESULTING MOMENT

- NORMAL SHEAR
- VIBRATION MAGNITUDE
- RESULTING MOMENT

METHOD FOR SUPPRESSING VIBRATION AND ACOUSTIC SIGNATURE IN A TILTROTOR AIRCRAFT

TECHNICAL FIELD

The technical field is methods for suppressing vibration and acoustic signature in a tiltrotor aircraft.

DESCRIPTION OF PRIOR ART

The Bell-Agusta BA609 is poised to be the world's first certified civil tiltrotor, which provides for conversion between a helicopter flight mode and an airplane flight mode. FIG. 1 is an oblique view of a BA609 tiltrotor aircraft 11, having a central fuselage 13 and wings 15 extending laterally therefrom. A nacelle 17 is pivotally mounted to the outer end of each wing 15, and each nacelle houses an engine (not shown) configured for rotating an attached multi-blade rotor 19. Nacelles 17 are shown in an intermediate angular position, which is between the horizontal position of airplane-mode, or wing-borne, flight and the vertical position of helicopter-mode, or rotor-borne, flight. Rotors 19 are counter-rotating and are shown in a symmetrically indexed configuration, in which the blades of both left and right rotors 19, which rotate in opposite directions, have the same angular orientation and operate in phase with each other. In other words, a blade of one rotor 19 passes the fuselage at the same moment as a blade of the other rotor 19.

As rotor assemblies 19 rotate during operation, vibrations are created that are transmitted from rotors 19 into wings 15 and fuselage 13. In helicopter mode flight, the BA609 demonstrates acceptable vibrations at a frequency of three cycles per rotor revolution (3/rev=28.5 Hz). However, testing has shown that as rotor speed reduces going into airplane mode the aircraft experiences significantly higher vibrations (3/rev=23.9 Hz). In particular, ride quality for the crew is unacceptable for continued envelope expansion, and instrument panel vibrations reach limit thresholds. The 3/rev vibrations are of primary concern because the BA609 is a three-bladed aircraft, and the strongest fixed system excitation occurs at a frequency of three times the speed of the rotor rotation.

FIG. 2 is a schematic view of aircraft 11 with the nacelles rotated into the airplane-mode flight position. Blades of rotors 19 cause lateral shear forces, which are indicated by arrows 21, 23, and these forces result in opposing and offsetting lateral vibrations, which are indicated by arrows 25, 27. Vertical shear forces are indicated by arrows 29, 31, and these forces result in vertical vibrations in the same direction, which are indicated by arrows 33, 35. Due to vibrations 33, 35 being in the same direction, vibrations 33, 35 combine to increase the magnitude of the vibrations felt in fuselage 13.

Various methods and apparatus have been suggested to reduce vibrations transmitted into the fuselage of tiltrotor aircraft during operation, but each typically adds weight and cost to the aircraft, and shortcomings remain.

In addition, various methods and apparatus have been suggested to reduce the acoustic signatures of tiltrotor aircraft caused by the blades during operation. Existing methods for reducing acoustic levels include variations in the shape of the tips of blades, operating speeds, and/or the number of blades per rotor. However, these techniques may impact the performance, cost, and/or weight of the aircraft, and shortcomings remain.

DESCRIPTION OF THE PREFERRED EMBODIMENT

As for all rotorcraft, controlling cabin vibrations is a significant concern, and a method of re-indexing the non-intermeshing rotors of the aircraft, as described herein, is designed to reduce vibrations and acoustic signature of the aircraft.

Figure 1:
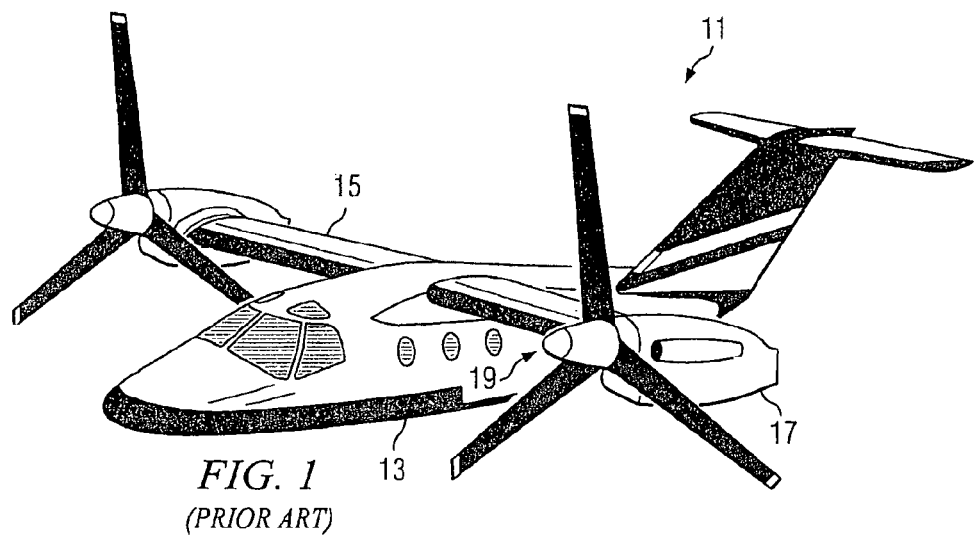
FIG. 1 is an oblique view of a prior-art tiltrotor aircraft.
Figure 2:
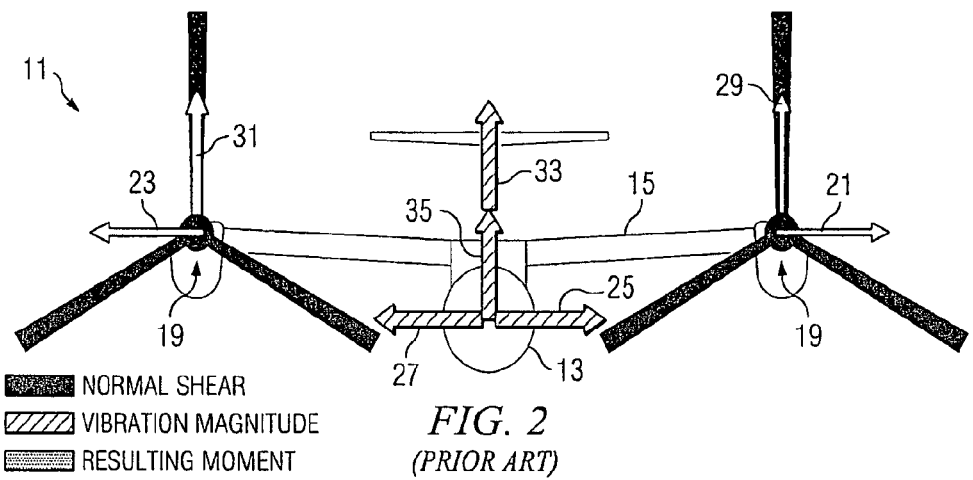
FIG. 2 is a front schematic view of a tiltrotor aircraft having a prior-art symmetric rotor configuration.
Figure 3:
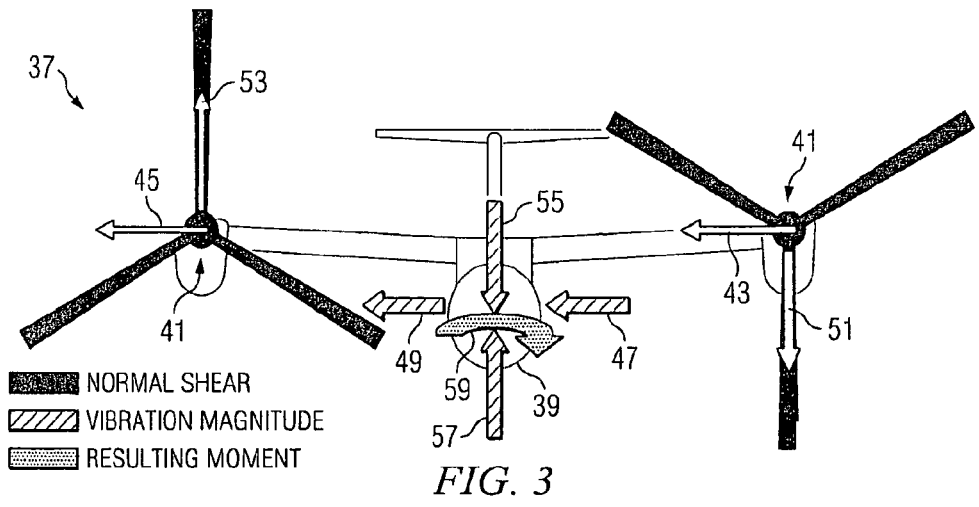
FIG. 3 is a front schematic view of a tiltrotor aircraft having an asymmetric rotor configuration.

FIG. 3 is a schematic view of a BA609 aircraft 37, which is similar in configuration and operation to aircraft 11, described above. To reduce vertical vibrations in fuselage 39 as rotors 41 counter-rotate in airplane-mode flight, rotors 41 may be asymmetrically indexed, as shown, so that the blades of the rotors are 60 degrees out of phase from each other. In other words, each blade of one rotor 41 passes the fuselage at a different time as each blade of the other rotor 41.

The 60-degree indexing for a three-blade rotor causes 180-degree phasing for the generated forces. To determine the amount of indexing required for rotors having more or fewer blades, the formula $$P(\text{indexing}) = P(\text{phasing})/N$$

Is used, wherein P(indexing) is the number of degrees that rotors having N number of blades need to be indexed relative to each other to achieve a desired P(phasing) degrees of phasing of the generated forces. For aircraft 37, the formula is calculated as $$60 \text{ degrees} = 180 \text{ degrees}/3,$$

so that the relative indexing amount between three-blade rotors 41 is 60 degrees.

Blades of rotors 41 cause lateral shear forces, which are indicated by arrows 43, 45, and these forces result in lateral vibrations, which are indicated by arrows 47, 49. Vertical 3/rev normal shear forces are indicated by arrows 51, 53, and these occur out of phase from each other. These forces result in opposing vertical vibrations, which are indicated by arrows 55, 57, that may cancel one another out as excitation sources in fuselage 39. However, due to forces 51, 53 being spaced from each other, forces 51, 53 cause a residual rolling moment about fuselage 39, as well as a residual lateral shear that could still excite asymmetric modes. Arrow 59 indicates the direction of the moment when rotors 41 are positioned as shown, but moment arrow 59 reverses direction when rotors 41 are rotated 60 degrees from the position shown in the figure.

In flight tests, re-indexing rotors 41 has been found to reduce vertical 3/rev vibrations by about one-half at all airspeeds, and vertical vibrations have also been reduced to acceptable levels. These results show that rotor indexing reduces vibrations to avoid exceeding limit levels of certain components while greatly improving the ride quality in the crew seats. Even more significant is the elegance of the re-indexing solution, in that it requires no extensive redesigns to structure or systems that would have been necessary for RPM changes or modal frequency alterations.

Another significant advantage realized through asymmetric indexing of rotors 41 is the reduced acoustic levels in the fuselage and at a distance from aircraft 37. With rotors 41 asymmetrically indexed, there is minimized reinforcement of the acoustic signature of one rotor 41 by the acoustic signature of the other rotor 41.

Figure 4:
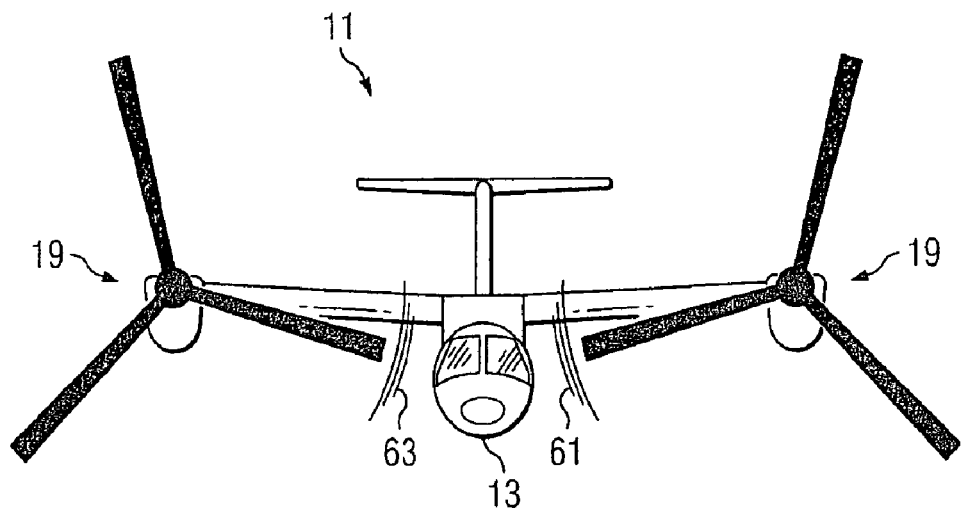
FIG. 4 is a front schematic view of an aircraft having a prior-art symmetric rotor configuration.

As shown in FIG. 4, rotors 19 of aircraft 11 are in a symmetrical index configuration, and pressure pulses, or acoustical waves 61, 63, are individually generated by the blades of each rotor 19. The symmetric indexing causes waves 61, 63 to reach fuselage 13 simultaneously at the rotor passage frequency (N/rev), creating a high-amplitude, low-frequency noise signature within fuselage 13.

Figure 5:
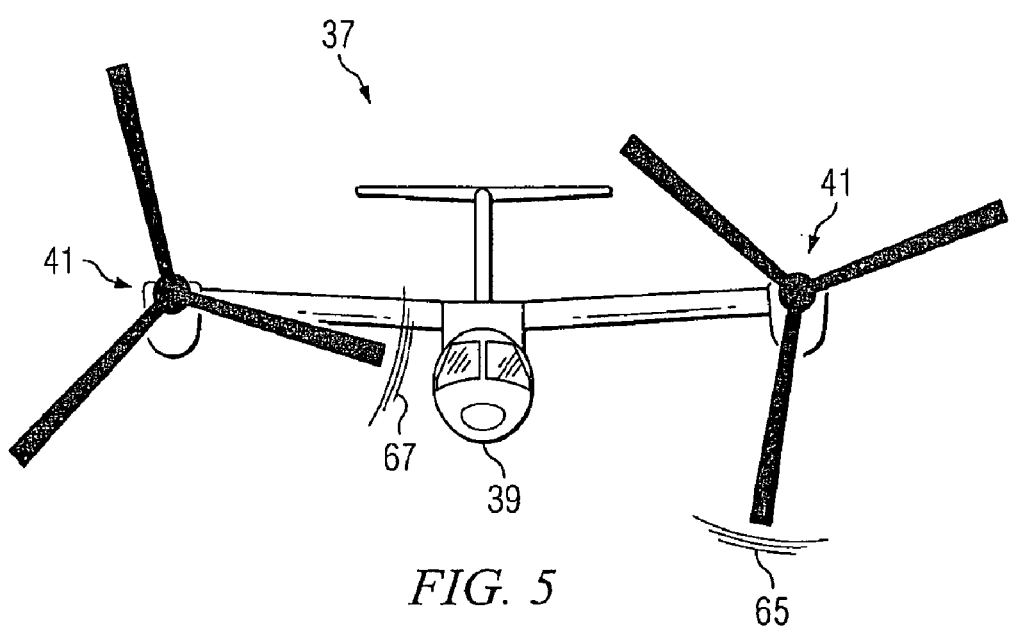
FIG. 5 is a front schematic view of an aircraft having an asymmetric rotor configuration.

FIG. 5 shows aircraft 37, which has the asymmetric indexing configuration of rotors 41. The blades of rotors 41 also each generate identical acoustical waves 65, 67, but the blade causing acoustical wave 65 has already passed fuselage 39 before the blade causing wave 67 passes fuselage 39. This means that waves 65, 67 do not combine at fuselage 39 to create a reinforced noise signature within fuselage 39. The resultant noise signature within fuselage 39 is perceived as having a lower amplitude and higher frequency (2×N/rev), which is less intrusive and may be easier to attenuate through other means, such as passive or active sound suppression devices.

Figure 6:
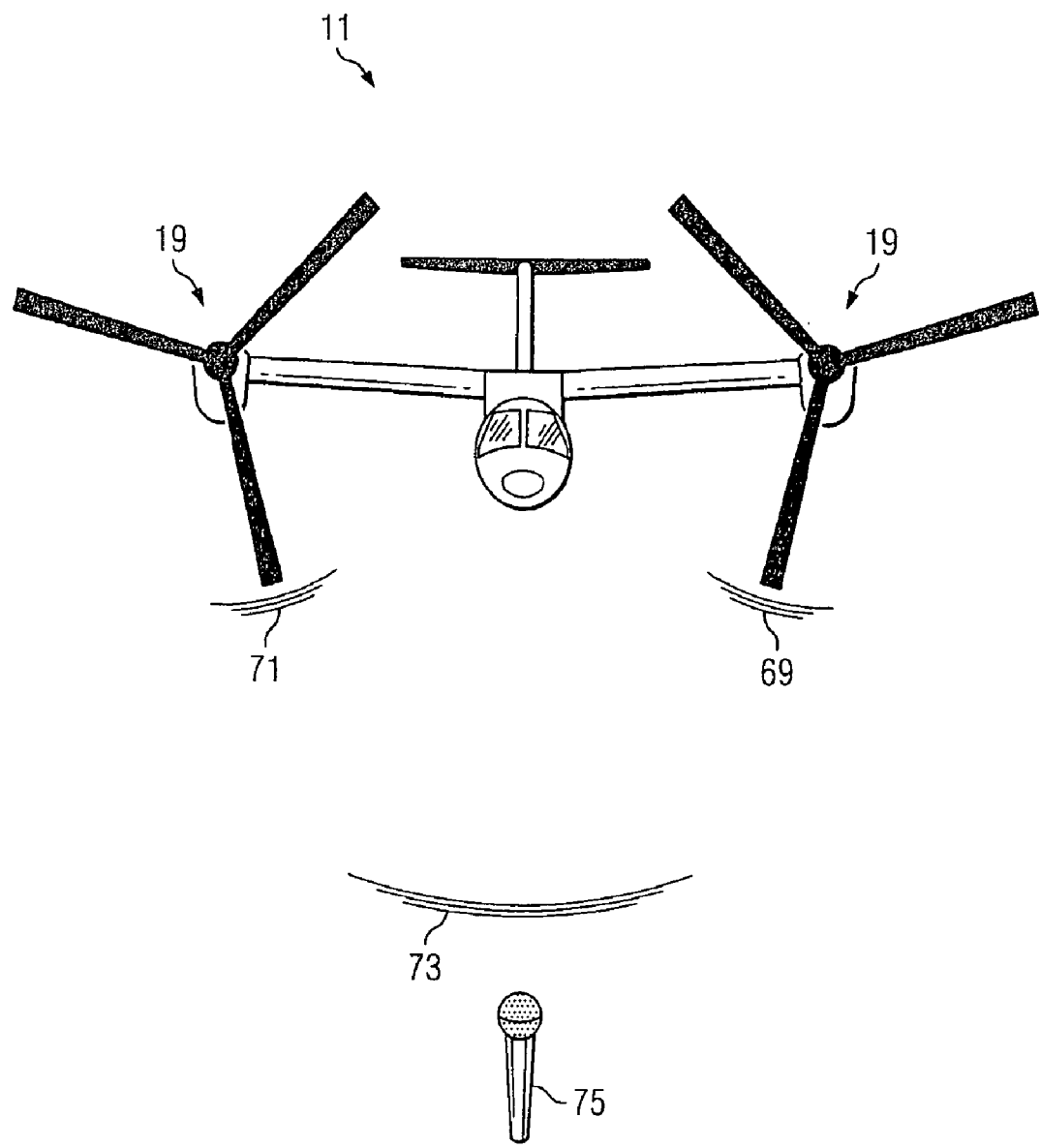
FIG. 6 is a front schematic view of an aircraft having a prior-art symmetric rotor configuration.

In addition, asymmetric indexing reduces acoustic signature as perceived by a distant observer. FIG. 6 shows symmetrically indexed rotors 19 creating acoustical waves 69, 71, which leave rotors 19 simultaneously and combine to form wave 73 at a distance from aircraft 11. When waves 73 arrive at a distant observer 75, waves 73 are perceived as an acoustic signature having a high amplitude and low frequency (N/rev).

Figure 7:
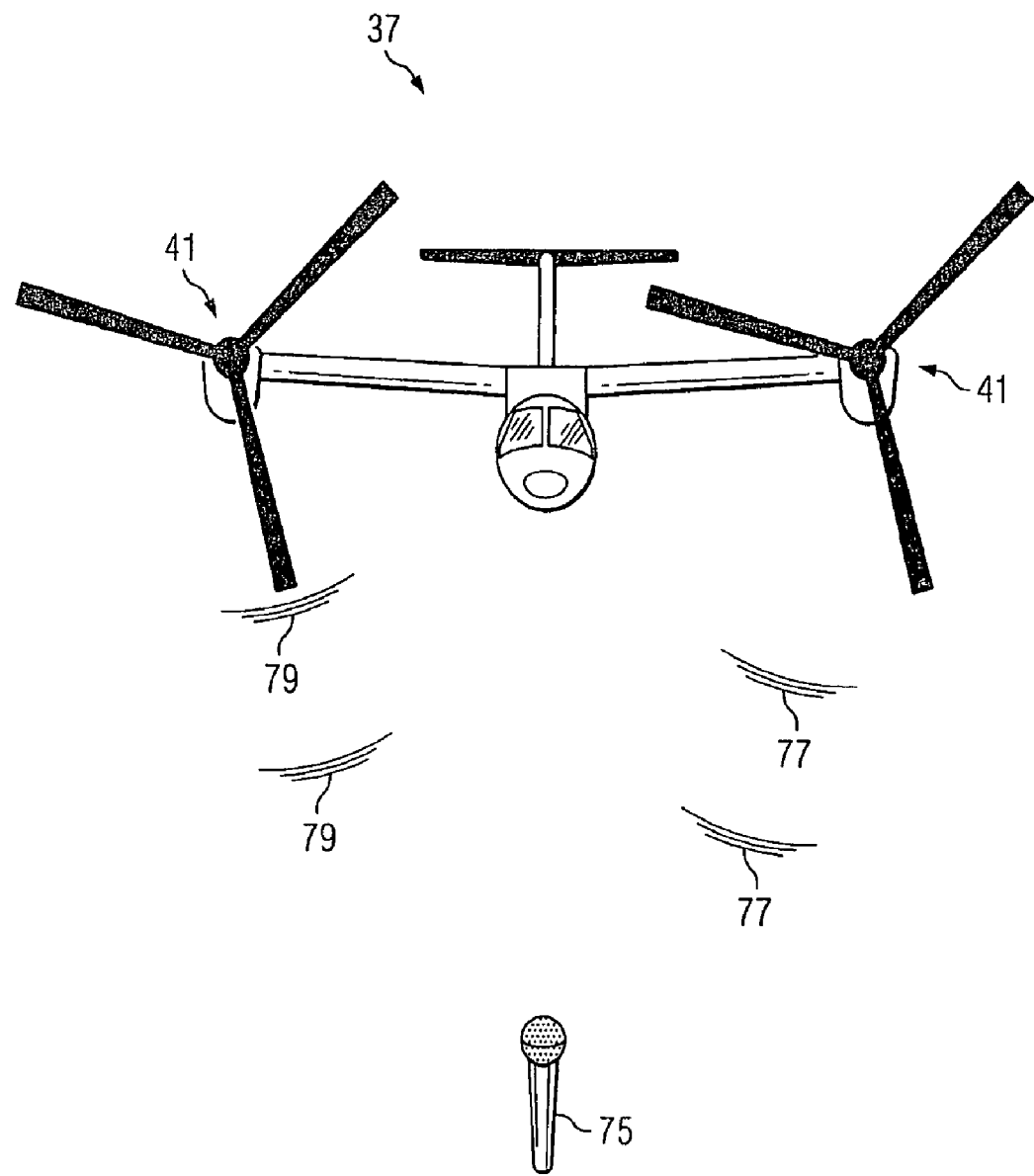
FIG. 7 is a front schematic view of an aircraft having an asymmetric rotor configuration.

However, FIG. 7 shows the asymmetrically indexed configuration of rotors 41, in which the blades cause acoustical waves 77, 79 to be offset from each other, or staggered. This means that waves 77, 79 do not combine at a distance, and waves 77, 79 arrive at distant observer at different times. The resulting acoustic signature, as perceived by distant observer 75, has a lower amplitude and higher frequency (2×N/rev).

The method described above provides for several advantages, including: (1) reduced vibrations transmitted to the fuselage of a tiltrotor aircraft; (2) a reduction of the generation of internal and external noise; (3) ease of implementation in existing aircraft; and (4) minimal cost of implementation.

While this invention has been described with reference to at least one illustrative embodiment, this description is not intended to be construed in a limiting sense. Various modifications and combinations of the illustrative embodiments, as well as other embodiments of the invention, will be apparent to persons skilled in the art upon reference to the description.

The invention claimed is:

1. A method for suppressing an external acoustic signature of an aircraft having at least one pair of non-intermeshing multiple-blade rotors, the method comprising:
   providing a tiltrotor having:
      a fuselage;
      a wing coupled to the fuselage; and
      a nacelle rotatably coupled to the wing and configured to pivot the at least one pair of intermeshing multiple-blade rotors in relation to the fuselage;
   determining the indexing angle for the at least one pair of non-intermeshing multiple-blade rotors, the rotors being indexed according to the number of blades, for achieving a phasing of generated forces exhibited in a plane parallel to that of the rotation of the blades, the forces generated from the reduction of rotor speed as the rotors pivot about the wing in relation to the fuselage;
   selecting a phasing angle configured to be selected in relation to the phasing of the generated force; and
   indexing each non-intermeshing multiple-blade rotor prior to flight, so that the blades of one rotor are selectively indexed in relation to the blades of the other rotor, the indexing between each pair of rotors remains consistently out of phase during flight such that the revolutions per minute of each rotor remains constant with respect to the other rotor;
   wherein the selected amount in degrees of asymmetrical indexing suppresses the external acoustic signature of the aircraft.

2. A method for suppressing an internal acoustic signature of an aircraft having at least one pair of non-intermeshing multiple-blade rotors, the method comprising:
   providing a tiltrotor having:
      a fuselage;
      a wing coupled to the fuselage; and
      a nacelle rotatably coupled to the wing and configured to pivot the at least one pair of intermeshing multiple-blade rotors in relation to the fuselage;
   determining the indexing angle for the at least one pair of non-intermeshing multiple-blade rotors, the rotors being indexed according to the number of blades, for achieving a phasing of generated forces exhibited in a plane parallel to that of the rotation of the blades, the forces generated from the reduction of rotor speed as the rotors pivot about the wing in relation to the fuselage;
   selecting a phasing angle configured to be selected in relation to the phasing of the generated force; and
   indexing each non-intermeshing multiple-blade rotor prior to flight, so that the blades of one rotor are selectively indexed in relation to the blades of the other rotor, the indexing between each pair of rotors remains consistently out of phase during flight such that the revolutions per minute of each rotor remains constant with respect to the other rotor;
   wherein the selected amount in degrees of asymmetrical indexing suppresses the internal acoustic signature of the aircraft.

3. A method for suppressing vibration in an aircraft having at least one pair of non-intermeshing multiple-blade rotors, the method comprising:
   providing a tiltrotor having:
      a fuselage;
      a wing coupled to the fuselage; and
      a nacelle rotatably coupled to the wing and configured to pivot the at least one pair of intermeshing multiple-blade rotors in relation to the fuselage;
   determining the indexing angle for the at least one pair of non-intermeshing multiple-blade rotors, the rotors being indexed according to the number of blades, for achieving a phasing of generated forces exhibited in a plane parallel to that of the rotation of the blades, the forces generated from the reduction of rotor speed as the rotors pivot about the wing in relation to the fuselage;
   selecting a phasing angle configured to be selected in relation to the phasing of the generated force; and
   indexing each non-intermeshing multiple-blade rotor prior to flight, so that the blades of one rotor are selectively indexed in relation to the blades of the other rotor, the indexing between each pair of rotors remains consistently out of phase during flight such that the revolutions per minute of each rotor remains constant with respect to the other rotor;
   wherein the selected amount in degrees of asymmetrical indexing suppresses vibration in the aircraft.

4. An aircraft, comprising:
a fuselage;
a plurality of wings extending from the fuselage;
a nacelle mounted to each wing being configured to rotate in relation to the fuselage; and
a pair of non-intermeshing multiple-blade rotors coupled to the nacelle, the pair of non-intermeshing multiple-blade rotors indexed in an asymmetrical manner according to an indexing angle derived from the number of blades and a phasing angle, the indexing angle being configured to reduce vibrations and acoustic signature of the aircraft by reducing forces generated from the reduction of rotor speed as the rotors pivot about the wing in relation to the fuselage, the forces being exhibited in a plane parallel to that of the multiple-blade rotors;
wherein the indexing angle is determined before flight, the revolutions per minute of each rotor remaining constant with respect to the other rotor such that the indexing angle remains consistently out of phase during flight; and
wherein the blades of one rotor in the pair are consistently out of phase from the blades of the other rotor in the pair.

* * * * *